US012631935B2

(12) United States Patent     (10) Patent No.:   US 12,631,935 B2

Sekiguchi et al.     (45) Date of Patent:    May 19, 2026

---

(54) OPTICAL SEMICONDUCTOR DEVICE

(71) Applicant: Sumitomo Electric Industries, Ltd., Osaka (JP)

(72) Inventors: Kosuke Sekiguchi, Osaka (JP); Keiji Tanaka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 294 days.

(21) Appl. No.: 18/597,561

(22) Filed: Mar. 6, 2024

(65) Prior Publication Data

US 2024/0302707 A1    Sep. 12, 2024

(30) Foreign Application Priority Data

Mar. 8, 2023   (JP) ................................. 2023-035970

(51) Int. Cl.
   *G02F 1/225*      (2006.01)
   *G02F 1/21*      (2006.01)

(52) U.S. Cl.
   CPC .............. *G02F 1/225* (2013.01); *G02F 1/212* (2021.01)

(58) Field of Classification Search
   CPC ................................. G02F 1/212; G02F 1/225
   See application file for complete search history.

(56) References Cited

U.S. PATENT DOCUMENTS

| | | | |
|---|---|---|---|
| 12,197,101 B2 * | 1/2025 | Kezuka ................... | G02F 1/065 |
| 2014/0342491 A1 * | 11/2014 | Masuyama ............ | G02B 6/131 |
| | | | 438/69 |
| 2021/0080795 A1 | 3/2021 | Kikuchi et al. | |
| 2022/0066280 A1 | 3/2022 | Kono | |
| 2024/0302707 A1 * | 9/2024 | Sekiguchi ............... | G02F 1/225 |

FOREIGN PATENT DOCUMENTS

| | | |
|---|---|---|
| JP | 2022-037930 A | 3/2022 |
| WO | 2019/176665 A1 | 9/2019 |

* cited by examiner

*Primary Examiner* — Rhonda S Peace

(74) *Attorney, Agent, or Firm* — Volpe Koenig

(57) ABSTRACT

An optical semiconductor device includes: an element portion provided on a principal surface of a substrate; first protruding portions provided on the principal surface; a resin body including a top surface and embedding the element portion and the first protruding portions; a wiring provided on the top surface; and a protective film covering the top surface and the wiring. The element portion includes a mesa protruding portion including a first semiconductor layer, and a mesa waveguide. The first protruding portions are separated from each other and each includes the first semiconductor layer. The wiring is provided between the first protruding portions and the element portion and includes a side surface adjacent to the first protruding portions. An angle formed by a first portion covering the side surface of the wiring and a second portion covering the top surface and connected to the first portion is acute.

6 Claims, 9 Drawing Sheets

OPTICAL SEMICONDUCTOR DEVICE

TECHNICAL FIELD

The present disclosure relates to an optical semiconductor device. This application claims the benefit of priority from Japanese Patent Application No. 2023-035970, filed on Mar. 8, 2023, the entire contents of which are incorporated herein by reference.

BACKGROUND

Japanese Unexamined Patent Publication No. 2022-37930 (Patent Document 1) discloses an optical modulator. This optical modulator includes a first mesa waveguide and a second mesa waveguide. In the optical modulator, each of the first mesa waveguide and the second mesa waveguide includes a first semiconductor layer provided on a substrate, a second semiconductor layer provided on the first semiconductor layer, a core layer provided on the second semiconductor layer, and a third semiconductor layer provided on the core layer. In the optical modulator, the first mesa waveguide and the second mesa waveguide are connected to an electrode pad provided on the substrate by wirings. PCT International Publication No. 2019/176665 (Patent Document 2) discloses a semiconductor optical modulator. This semiconductor optical modulator includes an n-InP clad layer, a semiconductor core layer, and a p-InP clad layer. In the semiconductor optical modulator, a signal electrode and a ground electrode are provided to apply a voltage to the semiconductor core layer.

SUMMARY

An aspect of the present disclosure relates to an optical semiconductor device. The optical semiconductor device includes: a substrate including a principal surface; an element portion provided on the principal surface and extending in a first direction; a plurality of first protruding portions provided on the principal surface and arranged in the first direction; a resin body including a top surface and embedding the element portion and the plurality of first protruding portions between the top surface and the principal surface; a wiring provided on the top surface and extending in the first direction; and a protective film covering the top surface and the wiring. In the optical semiconductor device, the element portion includes a mesa protruding portion provided on the principal surface and including a first semiconductor layer, and a mesa waveguide provided on the mesa protruding portion. The plurality of first protruding portions are separated from each other and each includes the first semiconductor layer. The wiring is provided between the plurality of first protruding portions and the element portion in a second direction crossing the first direction and includes a side surface extending in a third direction crossing the first direction and the second direction and in the first direction and adjacent to the plurality of first protruding portions. The protective film includes a first portion covering the side surface and a second portion covering the top surface and connected to the first portion. An angle formed by the first portion and the second portion is acute.

BRIEF DESCRIPTION OF THE DRAWINGS

FIG. 1 is a plan view illustrating an optical semiconductor device according to an embodiment.

FIG. 4 is a sectional view illustrating a peripheral structure of a first element portion included in the optical semiconductor device.

DETAILED DESCRIPTION

Figure 2:
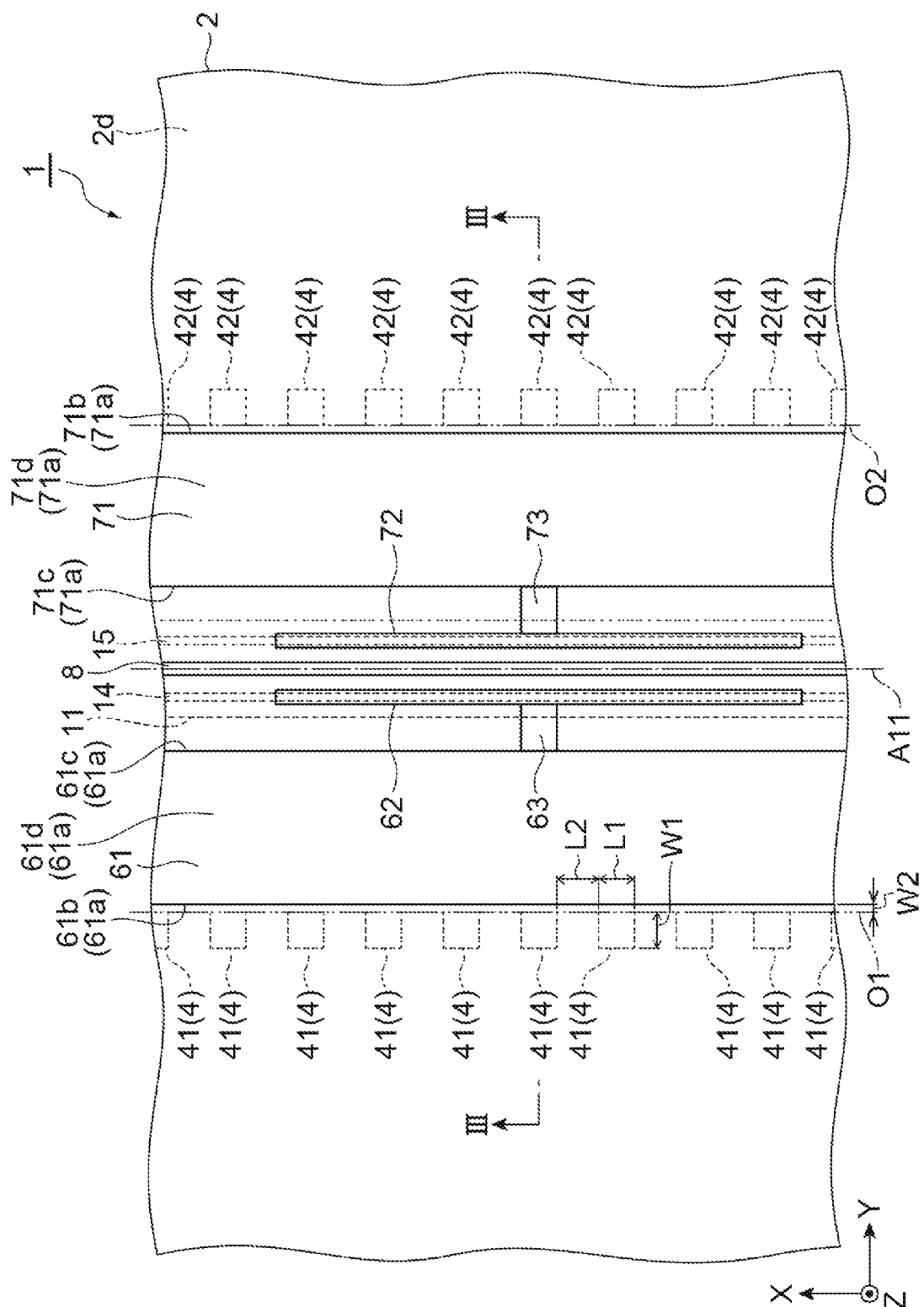
FIG. 2 is a partially enlarged plan view illustrating the optical semiconductor device illustrated in FIG. 1.

Problem to be Solved by Present Disclosure

In the semiconductor optical modulator described in PCT International Publication No. 2019/176665 or the like, a semiconductor layer is embedded in a resin body, and a wiring for transmitting a signal to the semiconductor layer is provided on the surface of the resin body. By providing a protective film on the surface of the resin body and the surface of the wiring, the resin body and the wiring may be protected. In this case, the resin body and the wiring are exposed to a high temperature at the time of formation of the protective film. When the temperature is lowered to room temperature after film formation, stress is generated between a part of the protective film provided on the surface of the resin body and a part of the protective film provided on the surface of the wiring due to a difference between a linear expansion coefficient of the resin body and a linear expansion coefficient of the wiring formed of a metal. In order to improve reliability, it is preferable to decrease such stress.

Effects of Present Disclosure

According to the present disclosure, it is possible to provide an optical semiconductor device that can decrease stress in a protective film for protecting a resin body and a wiring.

Description of Embodiment of Present Disclosure

First, details of an embodiment of the present disclosure will be described below in a list.

[1] An optical semiconductor device according to an embodiment of the present disclosure includes: a substrate including a principal surface; an element portion provided on the principal surface and extending in a first direction; a plurality of first protruding portions provided on the principal surface and arranged in the first direction; a resin body including a top surface and embedding the element portion and the plurality of first protruding portions between the top surface and the principal surface; a wiring provided on the top surface and extending in the first direction; and a protective film covering the top surface and the wiring. In the optical semiconductor device, the element portion includes a mesa protruding portion provided on the principal surface and including a first semiconductor layer, and a mesa waveguide provided on the mesa protruding portion. The plurality of first protruding portions are separated from each other and each includes the first semiconductor layer. The wiring is provided between the plurality of first protruding portions and the element portion in a second direction crossing the first direction and includes a side surface extending in a third direction crossing the first direction and the second direction and in the first direction and adjacent to the plurality of first protruding portions. The protective film includes a first portion covering the side surface and a second portion covering the top surface and connected to the first portion. An angle formed by the first portion and the second portion is acute.

In this optical semiconductor device, since the plurality of first protruding portions are embedded in the resin body and the wiring is provided between the plurality of first protruding portions and the element portion in the second direction, an angle formed by the side surface of the wiring adjacent to the first protruding portions and a part of the top surface of the resin body is acute. Accordingly, the angle formed by the first portion of the protective film covering the side surface of the wiring and the second portion of the protective film covering the top surface of the resin body and connected to the first portion is an acute angle. In this case, at the time of formation of the protective film, stress generated between the first portion and the second portion due to a difference between the linear expansion coefficient of the resin body and the linear expansion coefficient of the wiring is smaller than that in a case in which the angle formed by the first portion of the protective film and the second portion of the protective film is equal to or larger than 90°. Accordingly, with the optical semiconductor device, it is possible to decrease stress in the protective film for protecting the resin body and the wiring. In the optical semiconductor device, the plurality of first protruding portions are separated from each other and arranged in the first direction. In a plan view of the substrate, a total area of the plurality of first protruding portions is smaller than that in a case in which one first protruding portion extends continuously in the first direction. In the plurality of first protruding portions, an eddy current flows in the first semiconductor layer of each first protruding portion due to an electromagnetic induction effect when an electrical signal propagates in the wiring, and thus an eddy current loss may be caused. The eddy current loss is decreased by decreasing the area of the top surface of each first protruding portion. Accordingly, by separating the plurality of first protruding portions from each other, it is possible to decrease the eddy current loss in comparison with a case in which one first protruding portion extends in the first direction. As a result, in comparison with a case in which the plurality of first protruding portions are not separated from each other, it is possible to decrease an influence of the eddy current loss on electro-optical (EO) response characteristics of the optical semiconductor device.

[2] In the optical semiconductor device according to [1], the wiring may be separated from the plurality of first protruding portions in a plan view of the principal surface. In this case, since a distance between the wiring and the plurality of first protruding portions in the second direction is increased, it is possible to further decrease the eddy current loss in the plurality of first protruding portions. Accordingly, it is possible to further decrease an influence of the eddy current loss on the EO response characteristics of the optical semiconductor device.

[3] In the optical semiconductor device according to [1], the side surface may overlap the plurality of first protruding portions in a plan view of the principal surface. In this case, since the plurality of first protruding portions can be made to be closer to the wiring, it is possible to suppress an increase in width of the optical semiconductor device in the second direction.

[4] In the optical semiconductor device according to any one of [1] to [3], the resin body may include benzocyclobutene. In this case, since the resin body has a thermosetting property, it is possible to easily form the resin body.

[5] In the optical semiconductor device according to any one of [1] to [4], each of the plurality of first protruding portions may have a length in the first direction equal to or less than 10 μm and a width in the second direction equal to or less than 10 μm. In this case, since the area of each of the plurality of first protruding portions in a plan view of the principal surface is further decreased, it is possible to considerably decrease the eddy current loss in the plurality of first protruding portions when an electrical signal is transmitted by the wiring. Accordingly, it is possible to considerably decrease an influence of the eddy current loss on the EO response characteristics of the optical semiconductor device.

[6] The optical semiconductor device according to any one of [1] to [5] may further include a plurality of second protruding portions provided on the principal surface and arranged in the first direction, the plurality of second protruding portions may be embedded in the resin body between the principal surface and the top surface, and the plurality of second protruding portions may be separated from each other, each of which may include the first semiconductor layer. The plurality of second protruding portions may be located inside of the wiring in a plan view of the principal surface. In this case, since the plurality of second protruding portions are located inside of the wiring, a part of the top surface of the resin body on which the side surface of the wiring is provided becomes flat. Accordingly, it is possible to decrease stress on the side surface of the wiring.

Details of Embodiment of Present Disclosure

A specific example of an optical semiconductor device according to an embodiment will be described below with reference to the accompanying drawings according to necessity. The present disclosure is not limited to these examples, is defined by the appended claims, and is intended to include all modifications within meanings and scopes equivalent to the claims. In the following description, the same elements in description with reference to the drawings will be referred to by the same reference signs, and repeated description thereof will be omitted.

Figure 1:
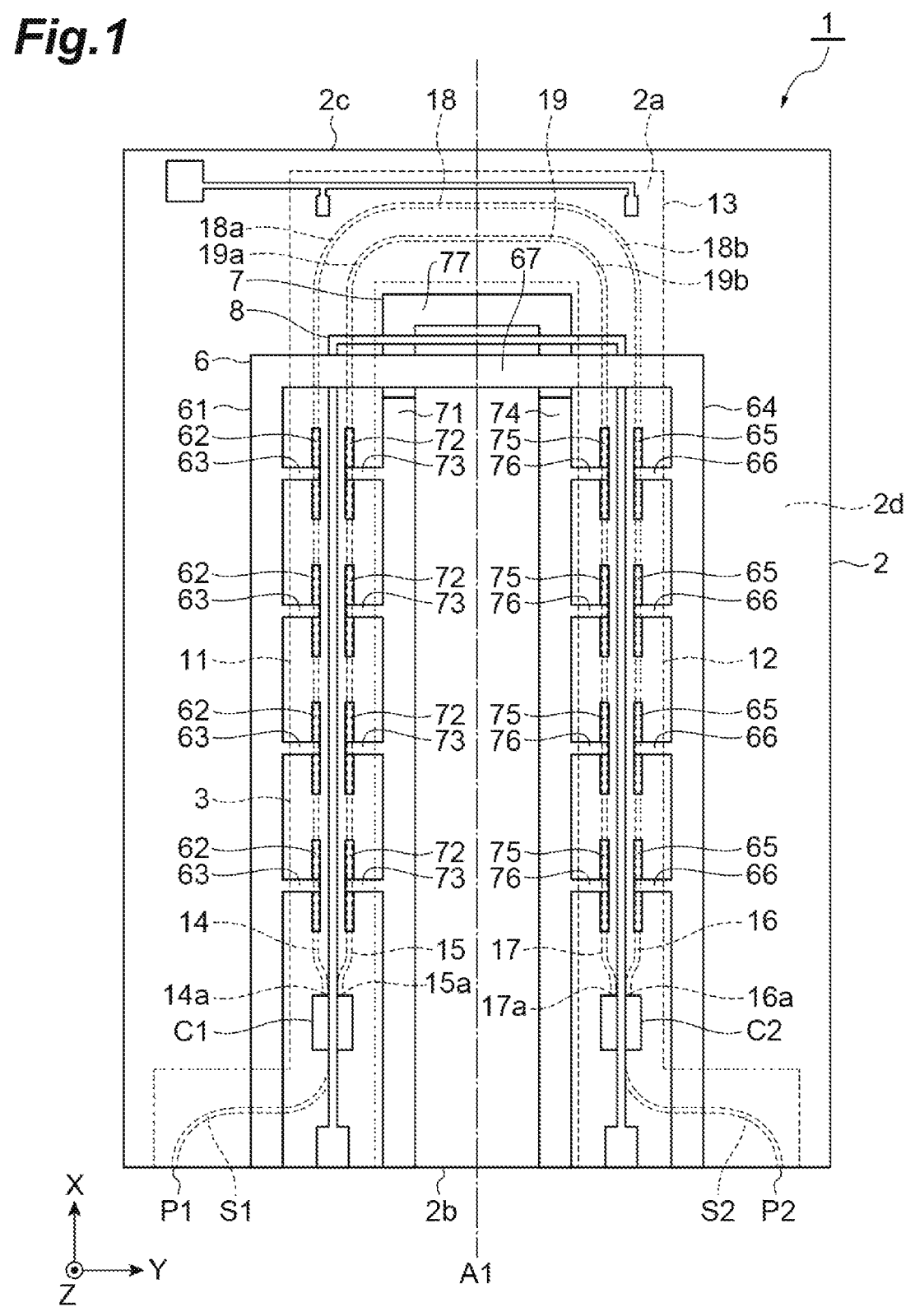

FIG. 1 is a plan view illustrating an optical semiconductor device 1 according to an embodiment. The optical semiconductor device 1 is, for example, a Mach-Zehnder modulator. For example, the optical semiconductor device 1 can modulate an intensity or a phase of light in optical communication and generate a modulated optical signal. As illustrated in FIG. 1, the optical semiconductor device 1 includes a substrate 2, an element portion 3, a first signal line 6, a second signal line 7, and a reference potential line 8. The substrate 2 is, for example, a group III-V semiconductor substrate such as an InP substrate. The substrate 2 includes a principal surface 2a. The element portion 3 other than a third element portion 13 which will be described later extends in one direction. In the following description, a direction in which the element portion 3 other than a third element portion 13 extends is referred to as an X direction (a first direction). A direction crossing the X direction is referred to as a Y direction (a second direction), and a direction crossing the X direction and the Y direction is referred to as a Z direction (a third direction). The principal surface 2a is a plane extending in the X direction and the Y direction. Here, the principal surface 2a includes undulations in the Z direction and includes a bottom surface 2d. The bottom surface 2d will be described later. A normal line of the principal surface 2a extends in the Z direction. The X direction, the Y direction, and the Z direction are, for example, perpendicular to each other. In the optical semiconductor device 1, a differential transmission line is constituted, for example, by the first signal line 6 and the second signal line 7.

The element portion 3 is a semiconductor-layer stacked body including a mesa waveguide. The element portion 3 includes a first element portion 11, a second element portion 12, and a third element portion 13. The element portion is also referred to as a mesa.

The first element portion 11 is provided on the principal surface 2a and extends in the X direction. The first element portion 11 includes a first mesa waveguide 14 and a second mesa waveguide 15. One end 14a of the first mesa waveguide 14 and one end 15a of the second mesa waveguide 15 are optically coupled to an optical demultiplexer C1. The optical demultiplexer C1 is, for example, a multi-mode interference instrument. The optical demultiplexer C1 is optically coupled to an output end of an input waveguide S1. An input end of the input waveguide S1 is an input port P1. The input port P1 is located in one edge 2b in the X direction of the substrate 2. Accordingly, the optical demultiplexer C1 can receive input light from the input port P1.

The first mesa waveguide 14 and the second mesa waveguide 15 extend in the X direction. The first mesa waveguide 14 and the second mesa waveguide 15 are arranged in the Y direction.

The second element portion 12 is provided on the principal surface 2a and extends in the X direction. The second element portion 12 includes a first mesa waveguide 16 and a second mesa waveguide 17. One end 16a of the first mesa waveguide 16 and one end 17a of the second mesa waveguide 17 are optically coupled to an optical multiplexer C2. The optical multiplexer C2 is, for example, a multi-mode interference instrument. The optical multiplexer C2 is optically coupled to an input end of an output waveguide S2. An output end of the output waveguide S2 is an output port P2. The output port P2 is located in one edge 2b of the substrate 2. Accordingly, the optical multiplexer C2 can provide output light to the output port P2.

The first mesa waveguide 16 and the second mesa waveguide 17 extend in the X direction. The first mesa waveguide 16 and the second mesa waveguide 17 are arranged in the Y direction.

The third element portion 13 is provided on the principal surface 2a. The third element portion 13 is provided in a part close to the other edge 2c in the X direction of the substrate 2. The edge 2c of the substrate 2 is located on the opposite side of the edge 2b in the X direction. The third element portion 13 includes a first mesa waveguide 18 and a second mesa waveguide 19. One end 18a of the first mesa waveguide 18 is coupled to the first mesa waveguide 14, and the other end 18b of the first mesa waveguide 18 is coupled to the first mesa waveguide 16. One end 19a of the second mesa waveguide 19 is coupled to the second mesa waveguide 15, and the other end 19b of the second mesa waveguide 19 is coupled to the second mesa waveguide 17.

The first element portion 11 and the second element portion 12 are configured to be symmetric with respect to a center line A1 extending in the X direction. In addition, the first signal line 6, the second signal line 7, and the reference potential line 8 are configured to be symmetric with respect to the center line A1. Accordingly, the first element portion 11 will be described below and description of the second element portion 12 will be omitted. The second element portion 12 has a configuration with which the first element portion 11 is symmetric with respect to the center line A1. For example, the first signal line 6 is a wiring for transmitting a signal to the first mesa waveguide 14 and the first mesa waveguide 16, and since a relationship with the first mesa waveguide 16 is the same as a relationship with the first mesa waveguide 14, detailed description of the second element portion 12 will be omitted. Since the first signal line 6 includes two parts which are symmetric with respect to the center line A1, only one part will be described and description of the other part symmetric therewith will be omitted.

The first signal line 6 is a wiring for transmitting an electrical signal to the first mesa waveguide 14 and the first mesa waveguide 16. The first signal line 6 transmits, for example, an electrical signal of several tens of Gbaud to the first mesa waveguide 14 and the first mesa waveguide 16. The first signal line 6 includes a first wiring 61, a plurality of first contact portions 62, a plurality of first connection portions 63, a second wiring 64, a plurality of second contact portions 65, a plurality of second connection portions 66, and a third wiring 67.

The first wiring 61 is a wiring for transmitting an electrical signal to the first mesa waveguide 14. The first wiring 61 is provided on the principal surface 2a and extends in the X direction. The first wiring 61 and the first mesa waveguide 14 are arranged in the Y direction. The first wiring 61 is separated from the first element portion 11 in the Y direction. A width of the first wiring 61 in the Y direction is, for example, equal to or greater than 30 μm and equal to or less than 70 μm.

The plurality of first contact portions 62 are provided on the first mesa waveguide 14 and extend in the X direction. The plurality of first contact portions 62 are separated from each other in the X direction. Each first contact portion 62 is a conductive member. The plurality of first connection portions 63 are conductive members for connecting the first wiring 61 to the plurality of first contact portions 62. The plurality of first connection portions 63 are provided on the principal surface 2a and extend in the Y direction. The second wiring 64, the plurality of second contact portions 65, and the plurality of second connection portions 66 are configured to be symmetric with respect to the center line A1 with the first wiring 61, the plurality of first contact portions 62, and the plurality of first connection portions 63, respectively.

The third wiring 67 is a wiring which is provided on the principal surface 2a and extends in the Y direction. One end of the third wiring 67 is electrically connected to the first wiring 61, and the other end of the third wiring 67 is electrically connected to the second wiring 64.

The second signal line 7 is a wiring for transmitting an electrical signal to the second mesa waveguide 15 and the second mesa waveguide 17. The second signal line 7 transmits, for example, an electrical signal of several tens of Gbaud to the second mesa waveguide 15 and the second mesa waveguide 17. The second signal line 7 includes a first wiring 71, a plurality of first contact portions 72, a plurality of first connection portions 73, a second wiring 74, a plurality of second contact portions 75, a plurality of second connection portions 76, and a third wiring 77.

The first wiring 71 is a wiring for transmitting an electrical signal to the second mesa waveguide 15. The first wiring 71 is provided on the principal surface 2a and extends in the X direction. The first wiring 71, the second mesa waveguide 15, the first mesa waveguide 14, and the first wiring 61 are arranged in this order in the Y direction. The first wiring 71 is separated from the first element portion 11 in the Y direction. The first mesa waveguide 14 and the second mesa waveguide 15 are disposed between the first wiring 61 and the first wiring 71 in the Y direction. A width of the first wiring 71 in the Y direction is, for example, equal to or greater than 30 μm and equal to or less than 70 μm.

The plurality of first contact portions 72 are provided on the second mesa waveguide 15 and extend in the X direction. The plurality of first contact portions 72 are separated from each other in the X direction. Each first contact portion 72 is a conductive member. The plurality of first connection portions 73 are conductive members for connecting the first wiring 71 to the plurality of first contact portions 72. The plurality of first connection portions 73 are provided on the principal surface 2a and extend in the Y direction. The second wiring 74, the plurality of second contact portions 75, and the plurality of second connection portions 76 are configured to be symmetric with respect to the center line A1 with the first wiring 71, the plurality of first contact portions 72, and the plurality of first connection portions 73, respectively.

The first wiring 61 is provided above the plurality of first connection portions 63 in the Z direction. The first wiring 71 is provided above the plurality of first connection portions 73 in the Z direction. In this way, in the optical semiconductor device 1, an electrical wiring (a first-layered wiring) formed on an insulating film M2 (see FIG. 3) and an electrical wiring (a second-layered wiring) formed above the first-layered wiring can be used for electrical connection. That is, two layers which are disposed vertically can be used as electrical wirings.

Figure 3:
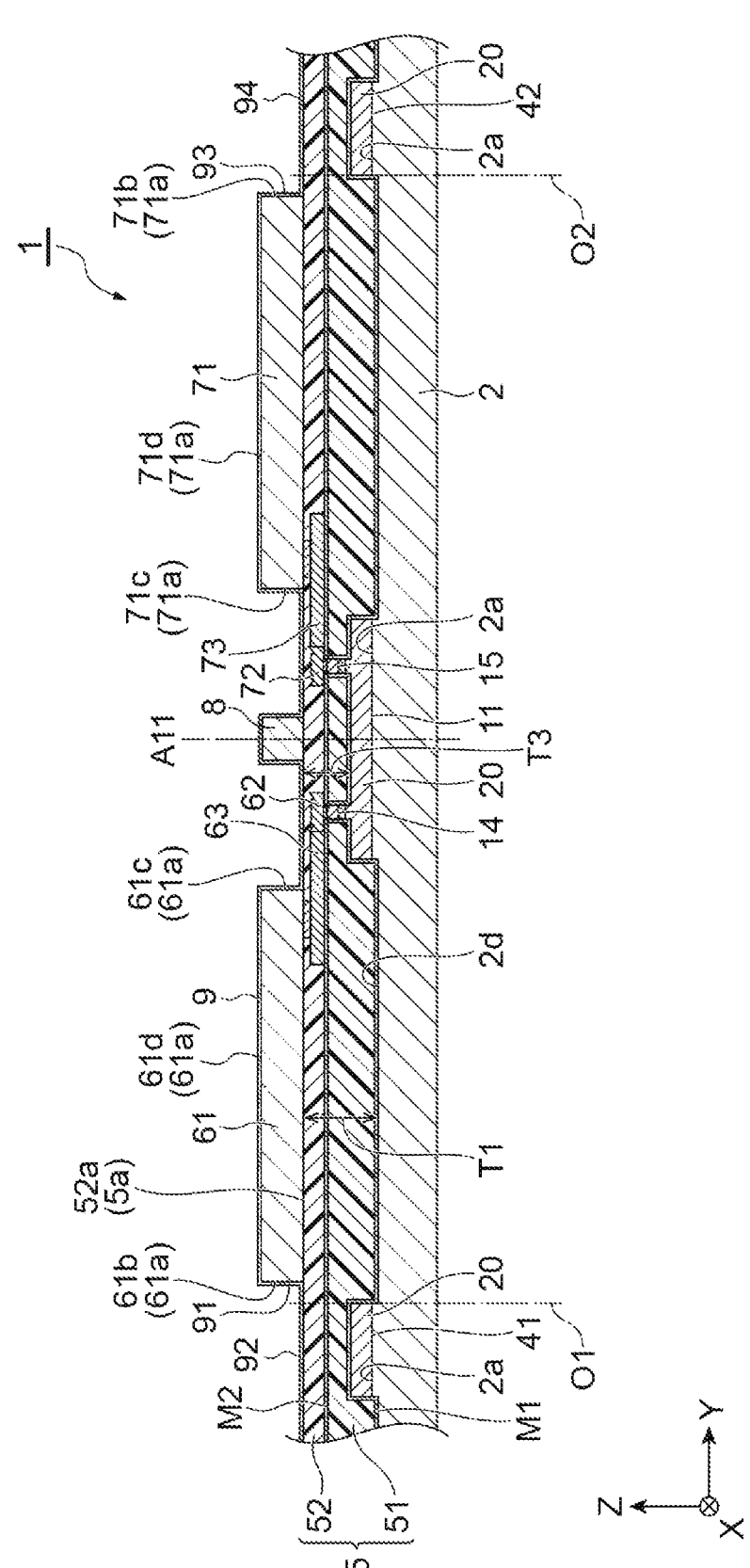
FIG. 3 is a sectional view along line III-III of the optical semiconductor device illustrated in FIG. 2.

The third wiring 77 is provided on an insulating film M1 (see FIG. 3). One end of the third wiring 77 is electrically connected to the first wiring 71, and the other end of the third wiring 77 is electrically connected to the second wiring 74. These electrical connections are performed using vias penetrating a second resin body 52 in the Z direction. The third wiring 77 is formed as a first-layered wiring, and the first wiring 61 and the second wiring 64 are formed as second-layered wirings. By forming the third wiring 77 as a first-layered wiring and forming the third wiring 67 as a second-layered wiring, the third wirings can cross each other in a plan view of the substrate 2 without electrically connecting each other.

The reference potential line 8 is a wiring set to a reference potential of an electrical signal. The first wiring 61 and the first wiring 71 transmit, for example, a differential signal. For example, the first wiring 61 transmits an in-phase component (the in-phase signal) of the differential signal, and the first wiring 71 transmits a reversed-phase component (the reversed-phase signal) of the differential signal. The in-phase signal and the reversed-phase signal are a pair of complementary signals, and the reversed-phase signal has a phase opposite to the phase of the in-phase signal. For example, the voltage of the reversed-phase signal decreases when the voltage of the in-phase signal increases, and the voltage of the reversed-phase signal increases when the voltage of the in-phase signal decreases. The first wiring 61 and the first wiring 71 constitute a differential transmission line for transmitting a differential signal. The differential transmission line is configured to have specific characteristic impedance (differential impedance). The differential characteristic impedance can be decreased, for example, by increasing the widths of the first wiring 61 and the first wiring 71. The differential transmission line may be configured without using the reference potential line 8.

In the optical semiconductor device 1, input light from the input port P1 is divided into two light components by the optical demultiplexer C1. One light component of the input light propagates in the first mesa waveguides 14, 18, and 16, and the other light component of the input light propagates in the second mesa waveguides 15, 19, and 17. The phase of light propagating in the first mesa waveguides 14 and 16 is changed by an electrical signal (an in-phase signal) from the first signal line 6. The phase of light propagating in the second mesa waveguides 15 and 17 is changed by an electrical signal (a reversed-phase signal) from the second signal line 7. The light propagating in the first mesa waveguides 14, 18, and 16 and the light propagating in the second mesa waveguides 15, 19, and 17 are multiplexed by the optical multiplexer C2. Accordingly, output light modulated by the differential signal is generated. The modulated output light is emitted to the outside of the optical semiconductor device 1 from the output port P2.

FIG. 2 is a partially enlarged plan view illustrating the optical semiconductor device 1 illustrated in FIG. 1. FIG. 3 is a sectional view along line III-III of the optical semiconductor device 1 illustrated in FIG. 2. As illustrated in FIGS. 2 and 3, the optical semiconductor device 1 further includes a plurality of protruding portions 4, a resin body 5, a protective film 9, and insulating films M1 and M2. The plurality of protruding portions 4 are also referred to as terraces.

As illustrated in FIG. 2, the plurality of protruding portions 4 include a plurality of first protruding portions 41 and a plurality of first protruding portions 42. The plurality of first protruding portions 41 and the plurality of first protruding portions 42 are provided on the principal surface 2a such that the first element portion 11 is interposed between the plurality of first protruding portions 41 and the plurality of first protruding portions 42 when seen in the Z direction (also referred to as a plan view of the substrate 2). The plurality of first protruding portions 41 are arranged in the X direction. When seen in the Z direction, the plurality of first protruding portions 41, the first wiring 61, and the first element portion 11 are arranged in this order in the Y direction. That is, the first wiring 61 is disposed between the plurality of first protruding portions 41 and the first element portion 11 in the Y direction. In this specification, "the first wiring 61 is disposed between the plurality of first protruding portions 41 and the first element portion 11 in the Y direction" includes a case in which the first wiring 61 overlaps the plurality of first protruding portions 41 in the Y direction. Even when the first wiring 61 overlaps the plurality of first protruding portions 41, a side surface 61b of the first wiring 61 is located between the center in the Y direction of the first protruding portions 41 and the first element portion 11. In this embodiment, the first wiring 61 does not overlap the plurality of first protruding portions 41 in the Y direction. The plurality of first protruding portions 41 are separated from each other.

Each of the plurality of first protruding portions 41 has, for example, a rectangular shape when seen in the Z direction. A length L1 in the X direction of each of the plurality of first protruding portions 41 is, for example, equal to or greater than 5 µm and equal to or less than 30 µm. A length (width) W1 in the Y direction of each of the plurality of first protruding portions 41 is, for example, equal to or greater than 5 µm and equal to or less than 30 µm. The length L1 may be equal to or less than 10 µm. The width W1 may be equal to or less than 10 µm. The width W1 may have the same value as the length L1. A distance L2 between neighboring first protruding portions 41 is, for example, equal to or greater than half the length L1 and equal to or less than double the length L1. The distance L2 may be set to be as small as possible as long as the neighboring first protruding portions 41 do not come into contact.

The plurality of first protruding portions 42 are arranged in the X direction. When seen in the Z direction, the plurality of first protruding portions 42, the first wiring 71, and the first element portion 11 are arranged in this order in the Y direction. That is, the first wiring 71 is disposed between the plurality of first protruding portions 42 and the first element portion 11 in the Y direction. In this specification, "the first wiring 71 is disposed between the plurality of first protruding portions 42 and the first element portion 11 in the Y direction" includes a case in which the first wiring 71 overlaps the plurality of first protruding portions 42 in the Y direction. Even when the first wiring 71 overlaps the plurality of first protruding portions 42, a side surface 71b of the first wiring 71 is located between the center in the Y direction of the first protruding portions 42 and the first element portion 11. In this embodiment, the first wiring 71 does not overlap the plurality of first protruding portions 42. The plurality of first protruding portions 42 are separated from each other.

Each of the plurality of first protruding portions 42 has, for example, a rectangular shape when seen in the Z direction. A length range in the X direction of each of the plurality of first protruding portions 42 is, for example, the same as the aforementioned range associated with the length L1. A width range in the Y direction of each of the plurality of first protruding portions 42 is, for example, the same as the aforementioned range associated with the width W1. A distance between neighboring first protruding portions 42 is, for example, the same as the aforementioned range associated with the distance L2. The plurality of first protruding portions 41 may be formed to be symmetric with the plurality of first protruding portions 42 with respect to a center line A11 extending in the X direction of the first element portion 11.

The first wiring 61 includes a surface 61a. The surface 61a includes a pair of side surfaces 61b and 61c facing each other in the Y direction and a top surface 61d extending in the XY plane. The top surface 61d is connected to upper sides of the side surfaces 61b and 61c. Each of the pair of side surfaces 61b and 61c extends in the Z direction and the X direction. The side surface 61b is a side surface adjacent to the plurality of first protruding portions 41. That is, when seen in the Z direction, the side surface 61b is closer to the plurality of first protruding portions 41 in the Y direction than the side surface 61c. Each of the pair of side surfaces 61b and 61c is formed, for example, to be perpendicular to the principal surface 2a along the XY plane. In a plan view of the substrate 2, the side surface 61c is separated from the first element portion 11.

The first wiring 61 is separated from a near end O1 of the plurality of first protruding portions 41 to the first element portion 11 in the Y direction. The near end O1 is an end in the vicinity of the first element portion 11 (an end closer to the first element portion 11) out of two ends in the Y direction of each first protruding portion 41. In FIG. 2, the near ends O1 of the plurality of first protruding portions 41 are aligned at the same position in the Y direction, and the near ends O1 are shown by one straight line. Similarly, the near ends O2 of the plurality of first protruding portions 42 are shown by one straight line. In this embodiment, a distance W2 between the plurality of first protruding portions 41 and the first wiring 61 in the Y direction is greater than 0 µm. That is, when seen in the Z direction, the first wiring 61 is separated from the plurality of first protruding portions 41. The distance W2 may be 0 µm. The distance W2 is, for example, equal to or less than double the width W1.

The first wiring 71 and the first wiring 61 are configured to be symmetric with each other with respect to the center line A11 extending in the X direction of the first element portion 11. A relationship between the first wiring 71 and the plurality of first protruding portions 42 is configured to be the same as the relationship between the first wiring 61 and the plurality of first protruding portions 41. The first wiring 71 includes a surface 71a. The surface 71a includes a pair of side surfaces 71b and 71c facing each other in the Y direction and a top surface 71d extending in the XY plane.

As illustrated in FIG. 3, each of the plurality of first protruding portions 41 and each of the plurality of first protruding portions 42 include a first semiconductor layer 20 provided on the principal surface 2a. For example, each of the plurality of first protruding portions 41 and each of the plurality of first protruding portions 42 include the first semiconductor layer 20 and a part of the substrate 2. The plurality of first protruding portions 41 and the plurality of first protruding portions 42 may be covered by the insulating film M1 which will be described later. Details of the first semiconductor layer 20 will be described later.

The plurality of protruding portions 4 may include a plurality of other first protruding portions (not illustrated). In this case, the plurality of first protruding portions may be provided on the principal surface 2a with the second element portion 12 interposed therebetween in the same way as the plurality of first protruding portions 41 and 42 are provided on the principal surface 2a with the first element portion 11 interposed therebetween. The plurality of first protruding portions have the same configuration as the plurality of first protruding portions 41 and 42. In the plurality of first protruding portions 41, the first protruding portions 41 are two-dimensionally arranged with the plurality of other first protruding portions in the X direction and the Y direction (see FIG. 7). Such a structure in which the protruding portions (terraces) are two-dimensionally arranged is referred to as a waffle structure.

The resin body 5 includes a first resin body 51 and a second resin body 52. The resin body 5 includes a top surface 5*a*. The top surface 5*a* is also a top surface 52*a* of the second resin body 52. The top surface 5*a* is aligned with the principal surface 2*a* in the Z direction. The resin body 5 is located between the top surface 5*a* and the principal surface 2*a* in the Z direction. More specifically, the resin body 5 is located between the top surface 5*a* and a bottom surface 2*d* which will be described later in the Z direction. Each of the first resin body 51 and the second resin body 52 includes, for example, benzocyclobutene (BCB). For example, each of the first resin body 51 and the second resin body 52 is mainly formed of benzocyclobutene.

The first resin body 51 is provided on the surface of a mesa protruding portion 11*a* (see FIG. 4) of the first element portion 11 which will be described later, on a side surface of the first mesa waveguide 14, on the side surface of the second mesa waveguide 15, on the surface of the plurality of first protruding portions 41, on the surface of the plurality of first protruding portions 42, and in a region on the substrate 2 (on the bottom surface 2*d*) in which none of the first element portion 11, the plurality of first protruding portions 41, and the plurality of first protruding portions 42 are provided. Accordingly, the first resin body 51 embeds the first element portion 11, the plurality of first protruding portions 41, and the plurality of first protruding portions 42 therein. That is, the resin body 5 embeds the first element portion 11, the plurality of first protruding portions 41, and the plurality of first protruding portions 42 therein. When the plurality of other first protruding portions (not illustrated) are provided on the principal surface 2*a* with the second element portion 12 interposed therebetween, the first resin body 51 may embed the plurality of other first protruding portions.

The bottom surface 2*d* is formed by removing the first semiconductor layer 20 other than the element portion 3 and the plurality of protruding portions 4 to electrically isolate the element portion 3 and the plurality of protruding portions 4 after the first semiconductor layer 20 has been formed on the principal surface 2*a*. The bottom surface 2*d* may be formed by partially removing an upper part including the principal surface 2*a* of the substrate 2. In this case, the height of the bottom surface 2*d* is smaller than the height of the original principal surface 2*a* in the Z direction.

The first resin body 51 may be provided on the first element portion 11, the second element portion 12, the third element portion 13, a plurality of first protruding portions provided outside of the element portions, and a part in which none of the element portions and the plurality of first protruding portions are provided. In other words, the first resin body 51 may be provided on the whole surface of the substrate 2. In this case, the first resin body 51 embeds the element portion 3 and the plurality of first protruding portions therein. The first resin body 51 includes a flattened surface.

As illustrated in FIG. 3, the second resin body 52 is provided on the flattened surface of the first resin body 51 such that the plurality of first contact portions 62, the plurality of first connection portions 63, the plurality of first contact portions 72, and the plurality of first connection portions 73 are embedded therein. The second resin body 52 may be provided on the first resin body 51 such that the plurality of second contact portions 65, the plurality of second connection portions 66, the second contact portions 75, and the plurality of second connection portions 76 (see FIG. 1) are embedded therein. The second resin body 52 includes a top surface 52*a*. By additionally performing embedment using the second resin body 52 on the flattened surface of the first resin body 51, the top surface 52*a* is flattened. The top surface 52*a* is aligned with the bottom surface 2*d* in the Z direction. A height T1 from the bottom surface 2*d* to the top surface 52*a* (the top surface 5*a*) in the Z direction is, for example, equal to or greater than 5 μm. The height T1 corresponds to a thickness of the resin body 5 (a film thickness).

The insulating film M1 is provided between the bottom surface 2*d* and the first resin body 51. The insulating film M2 is provided between the first resin body 51 and the second resin body 52. The insulating film M2 is provided on the first resin body 51 to avoid an electrode E1 (see FIG. 4) and an electrode E2 (see FIG. 4) which will be described later. Each of the insulating film M1 and the insulating film M2 is, for example, a silicon-based inorganic insulating film. The film thickness T1 of the resin body 5 may include film thicknesses of the insulating films M1 and M2.

The first wiring 61 is provided on the top surface 52*a* of the second resin body 52. That is, the first wiring 61 is provided on the top surface 5*a* of the resin body 5. The first contact portions 62 are embedded in the second resin body 52. The first connection portions 63 pass through through-holes (not illustrated) formed in the second resin body 52. The through-holes extend from the top surface 52*a* of the second resin body 52 to the first contact portions 62. The first connection portions 63 passing through the through-holes reach the first contact portions 62 embedded in the second resin body 52.

The first wiring 71 is provided on the top surface 52*a* of the second resin body 52. That is, the first wiring 71 is provided on the top surface 5*a* of the resin body 5. The first contact portions 72 are embedded in the second resin body 52. The first connection portions 73 pass through through-holes (not illustrated) formed in the second resin body 52. The through-holes extend from the top surface 52*a* of the second resin body 52 to the first contact portions 72. The first connection portions 73 passing through the through-holes reach the first contact portions 72 embedded in the second resin body 52.

The top surface 5*a* of the resin body 5 is flattened by embedding the element portion 3 and the plurality of first protruding portions 41 and 42 using the first resin body 51 and additionally embedding the first contact portions 62 and 72 and the first connection portions 63 and 73 using the second resin body 52.

The protective film 9 is provided on the surface 61*a* of the first wiring 61 and the surface 71*a* of the first wiring 71. The protective film 9 is additionally provided in a part of the top surface Sa of the resin body 5 in which none of the first wiring 61 and the first wiring 71 are provided. In other words, the protective film 9 is provided on the whole top surface 5*a*. The protective film 9 protects the surfaces 61*a* and 71*a* of the first wirings 61 and 71 and the top surface 5*a* in which the first wirings 61 and 71 are not provided from the outside. The protective film 9 is, for example, a silicon-based inorganic insulating film.

The protective film 9 includes a first portion 91 provided on the side surface 61*b* close to the plurality of first protruding portions 41 in the Y direction out of the side surfaces 61*b* and 61*c* of the first wiring 61 and a second portion 92 provided on the top surface 5*a* of the resin body 5 and connected to the first portion 91. The second portion 92 extends in the Y direction from the side surface 61*b* to the center in the Y direction of the plurality of first protruding portions 41. The protective film 9 includes a third portion 93 and a fourth portion 94 associated with the first wiring 71 similarly to the first wiring 61.

Figure 4:
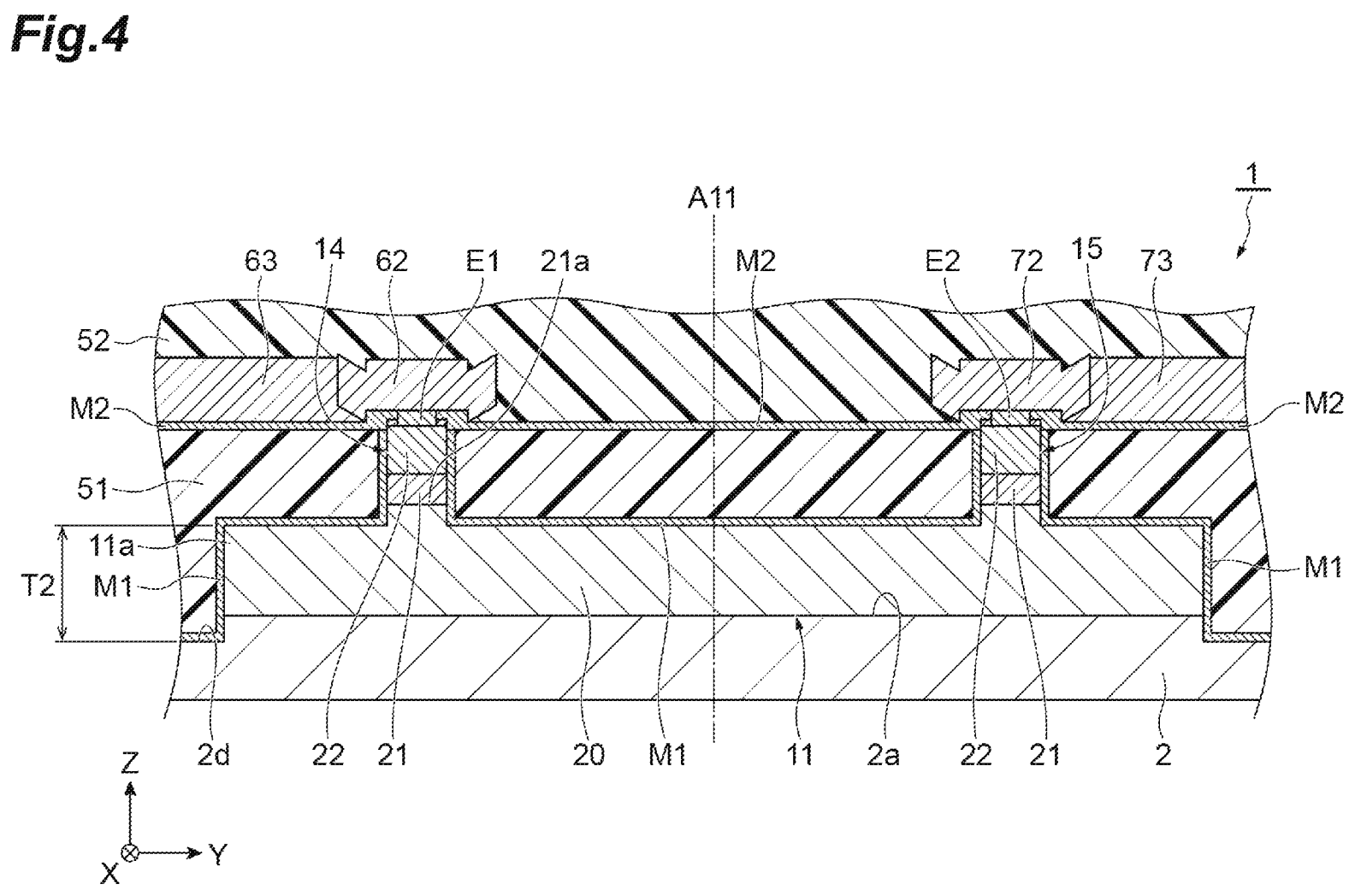

FIG. 4 is a sectional view illustrating a peripheral structure of the first element portion 11 in the optical semiconductor device 1. The first element portion 11 includes a mesa protruding portion 11a, a first mesa waveguide 14 provided on the mesa protruding portion 11a, and a second mesa waveguide 15 provided on the mesa protruding portion 11a. A height T2 of the top surface of the mesa protruding portion 11a from the bottom surface 2d is, for example, the same as the height of each of the plurality of first protruding portions 41 and the plurality of first protruding portions 42 (see FIG. 3) from the bottom surface 2d. The height of the mesa protruding portion 11a from the principal surface 2a and the height of each of the plurality of first protruding portions 41 and the plurality of first protruding portions 42 from the bottom surface 2d may be different from each other. The heights may include the film thickness of the insulating film M1.

The mesa protruding portion 11a includes the first semiconductor layer 20 provided on the principal surface 2a. For example, the mesa protruding portion 11a includes the first semiconductor layer 20 and a part of the substrate 2. Each of the first mesa waveguide 14 and the second mesa waveguide 15 includes a part of the first semiconductor layer 20, a core layer 21 provided in the part of the first semiconductor layer 20, and a second semiconductor layer 22 provided on the core layer 21. The first semiconductor layer 20 includes, for example, group III-V compound semiconductor such as p-type InP. The core layer 21 is an i-type semiconductor layer (an undoped semiconductor layer). The core layer 21 may have a multi-quantum well structure. The core layer 21 includes, for example, AlGaInAs-based group III-V compound semiconductor. The second semiconductor layer 22 includes, for example, group III-V compound semiconductor such as n-type InP. Each of the second element portion 12 and the third element portion 13 illustrated in FIG. 1 may include the same protruding portion (not illustrated) as in the mesa protruding portion 11a. Each of the first mesa waveguides 16 and 18 and the second mesa waveguides 17 and 19 includes a part of the first semiconductor layer 20, the core layer 21, and the second semiconductor layer 22. The first protruding portions 41 and 42 can be formed at the same time as formation of the mesa protruding portion 11a by etching. The insulating film M1 may be provided on the side surface of the mesa protruding portion 11a and in a part on the top surface of the mesa protruding portion 11a other than the first mesa waveguide 14 and the second mesa waveguide 15. The insulating film M1 may be further provided on the side surface of the first mesa waveguide 14 and the second mesa waveguide 15.

The height T2 from the bottom surface 2d to the top surface of the mesa protruding portion 11a in the Z direction illustrated in FIG. 4 is, for example, equal to or greater than 2 μm and equal to or less than 4 μm. When the height T2 is equal to or greater than 2 μm, the first element portion 11 can be electrically separated from a portion other than the element portion 3. For example, when another element portion with the same structure as the element portion 3 is formed on the substrate 2, the mesa protruding portion of the element portion 3 and a mesa protruding portion of the other element portion can be electrically separated from each other by removing the first semiconductor layer 20 in the portion other than the element portions. When the height T2 is equal to or less than 4 μm, the film thickness T1 of the resin body 5 may not be excessively large. The film thickness T1 (see FIG. 3) is larger by the film thickness T3 (see FIG. 3) of the resin body 5 on the first element portion 11 than the height T2 of the mesa protruding portion 11a. When the thickness of the first semiconductor layer 20 is equal to or greater than 4 μm, the height T2 may greater than 4 μm. When the height T2 of the mesa protruding portion 11a increases, the film thickness T1 of the resin body 5 also increases. When a distance between the top surface of the mesa protruding portion 11a and the top surface 5a of the resin body 5 is defined as a film thickness T3, a sum of the height T2 and the film thickness T3 is equal to the film thickness T1. The film thickness T3 is, for example, equal to or greater than 1 μm. When the film thickness T3 increases, the flatness of the top surface 5a of the resin body 5 may grow worse.

The electrode E1 is provided on the second semiconductor layer 22 included in the first mesa waveguide 14. The first contact portions 62 are provided on the electrode E1 to be in contact with the electrode E1. The electrode E2 is provided on the second semiconductor layer 22 included in the second mesa waveguide 15. The first contact portions 72 are provided on the electrode E2 to be in contact with the electrode E2. Similarly to the first element portion 11, in the second element portion 12, electrodes are provided on the first mesa waveguide 16 and the second mesa waveguide 17.

Figure 5A:
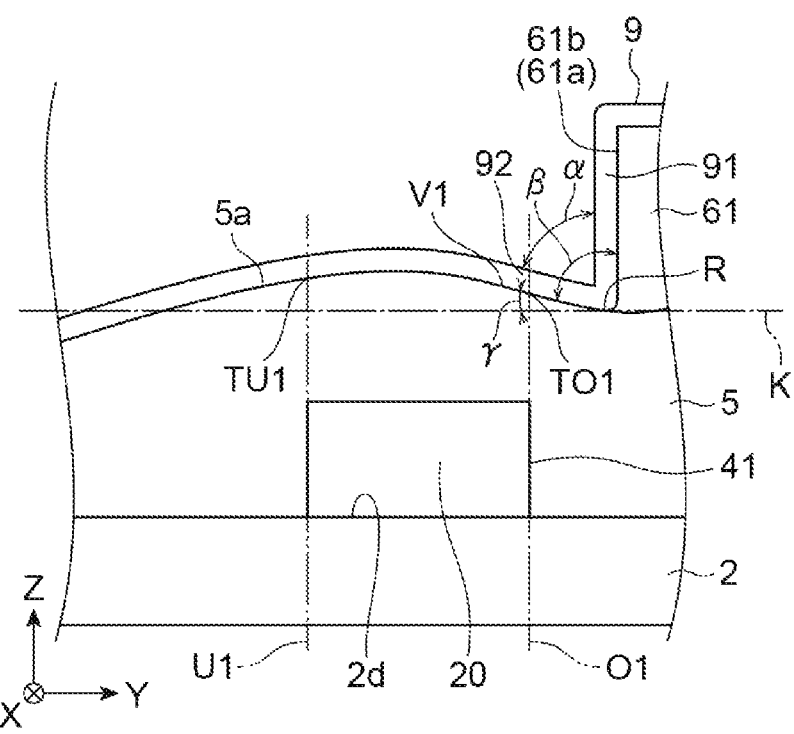
FIG. 5A is a sectional view schematically illustrating a state in which a first wiring is separated from the center of a plurality of first protruding portions to the first element portion.

Advantages of the optical semiconductor device 1 according to this embodiment described above will be described below with reference to FIGS. 5A and 5B. FIG. 5A is a sectional view schematically illustrating a state in which the near ends O1 of the plurality of first protruding portions 41 are separated from the first wiring 61 in the Y direction. The near end O1 is an end closer to the first element portion 11 out of two ends in the Y direction of each first protruding portion 41. A far end U1 is an end farther from the first element portion 11 than the near end O1. In the Y direction, the near end O1 is located between the first element portion 11 and the far end U1. In the optical semiconductor device 1, since the plurality of first protruding portions 41 are embedded in the resin body 5, a part V1 of the top surface 5a of the resin body 5 is tilted such that a contact point R is lower than a top end TO1 in the Z direction at the near end O1 of the resin body 5. Here, the contact point R is a point at which a lower end in the Z direction of the side surface 61b comes into contact with the top surface 5a of the resin body 5. The part V1 of the top surface 5a includes the contact point R and the top end TO1. The first protruding portions 41 are provided such that the contact point R is located between the near end O1 and the first element portion 11 in the Y direction. Accordingly, an included angle β formed by the side surface 61b closer to the near end O1 out of a pair of side surfaces 61b and 61c of the first wiring 61 and the part V1 of the top surface 5a of the resin body 5 is an acute angle. In other words, a gradient angle γ of the top surface Sa of the resin body 5 with respect to a virtual plane K parallel to the principal surface 2a and passing through the contact point R is greater than 0°. When the film thickness of the second portion 92 of the protective film 9 is the same as the film thickness of the first portion 91 of the protective film 9, an included angle α is the same as the included angle β. Accordingly, the included angle α formed by the first portion 91 of the protective film 9 provided on the side surface 61b and the second portion 92 of the protective film 9 provided on the top surface 5a of the resin body 5 and extending to the near end O1 from the side surface 61b in the Y direction is an acute angle. For example, values of the included angle α and the included angle ß are, for example, equal to or greater than 88° and less than 90°. The included angle xx and the included angle ß may be equal to or less than 88°. Similarly to the included angle α formed by the first portion 91 and the second portion 92, an included angle formed by the third portion 93 and the fourth portion 94 illustrated in FIG. 3 is an acute angle. Here, the included angles α and ß and the gradient angle γ are angles in a cross-section parallel to the YZ plane. Accordingly, the included angle α or the included angle β can be ascertained by observing the cross-section using a microscope.

Figure 5B:
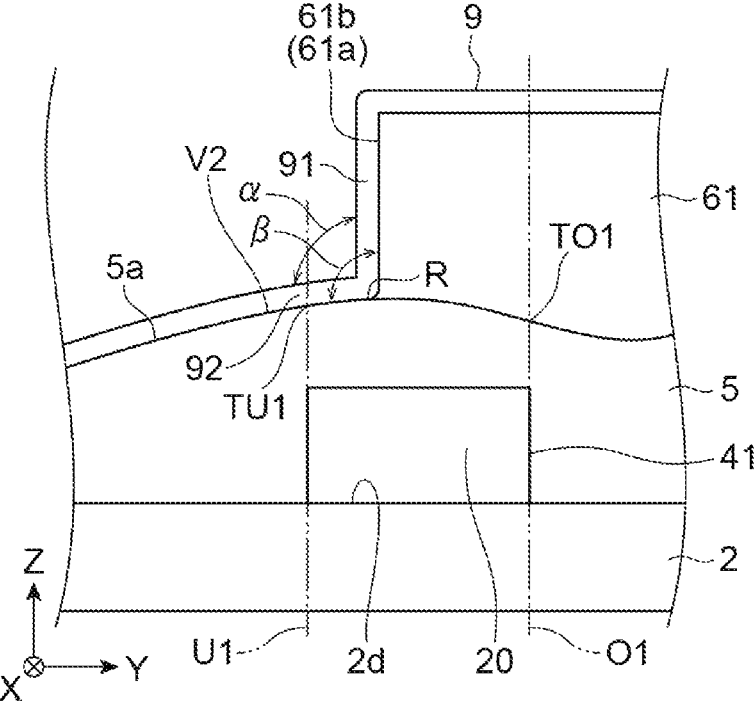
FIG. 5B is a sectional view schematically illustrating a state in which the first wiring is separated from the center of the plurality of first protruding portions to a side opposite to the first element portion.

FIG. 5B is a sectional view schematically illustrating a state in which the plurality of first protruding portions 41 are provided such that the near ends O1 of the plurality of first protruding portions 41 are located between the side surface 61b of the first wiring 61 and the first element portion 11 (see FIG. 3) as a reference example. The angle α formed by the first portion 91 and the second portion 92 when the side surface 61b of the first wiring 61 is provided above the first protruding portions 41 will be described below with reference to FIG. 5B. In the Y direction, the contact point R of the side surface 61b is closer to the center of the first protruding portions 41 than the top end TO1 at the near end O1 and the top end TU1 at the far end U1. The thickness (film thickness) of the resin body 5 is the largest at the center on each of the first protruding portions 41 and decreases toward the near end O1 or the far end U1 from the center. Accordingly, in the Z direction, the top end TU1 in the Z direction at the far end U1 of the resin body 5 is lower than the contact point R. As a result, the angle ß formed by the side surface 61b and a part V2 of the top surface 5a of the resin body 5 is equal to or greater than 90°, and the angle α formed by the first portion 91 of the protective film 9 and the second portion 92 of the protective film 9 is equal to or greater than 90°.

In the aforementioned optical semiconductor device 1 according to this embodiment, since the near end O1 of the plurality of first protruding portions 41 and the first element portion 11 (see FIG. 3) interpose the first wiring 61 therebetween, the angle α formed by the first portion 91 of the protective film 9 provided on the side surface 61b and the second portion 92 of the protective film 9 provided on the top surface 5a of the resin body 5 is an acute angle. Accordingly, stress generated between the first portion 91 and the second portion 92 due to a difference between a linear expansion coefficient of the resin body 5 and a linear expansion coefficient of the first wiring 61 at the time of formation of the protective film 9 is smaller than that when the angle formed by the first portion 91 of the protective film 9 and the second portion 92 of the protective film 9 is equal to or greater than 90°. As a result, with the optical semiconductor device 1, it is possible to decrease the stress in the protective film 9 for protecting the resin body 5 and the first wiring 61.

In the optical semiconductor device 1, the plurality of first protruding portions 41 are separated from each other and arranged in the X direction. In a plan view of the substrate 2, a total area of the plurality of first protruding portions 41 is smaller than that in a case in which one first protruding portion 41 extends continuously in the X direction. In the plurality of first protruding portions 41, an eddy current flows in the first semiconductor layer 20 of the first protruding portions 41 due to an electromagnetic induction effect when an electrical signal propagates in the first wiring 61, and thus an eddy current loss may be caused. The eddy current loss is decreased by decreasing the area of the top surface of the first protruding portions 41. Accordingly, by separating the plurality of first protruding portions 41 from each other, it is possible to decrease the eddy current loss in comparison with a case in which one first protruding portion 41 extends in the X direction. As a result, in comparison with a case in which the plurality of first protruding portions 41 are not separated from each other, it is possible to decrease an influence of the eddy current loss on electro-optical (EO) response characteristics of the optical semiconductor device 1.

In the optical semiconductor device 1, the distance L2 between the neighboring first protruding portions 41 is, for example, equal to or greater than 5 μm and equal to or less than 20 μm. When the distance L2 is equal to or greater than 5 μm, the total area of the top surfaces of the plurality of first protruding portions 41 is smaller than the area of the top surfaces when one first protruding portion 41 extends in the X direction such that the total length of the one first protruding portion 41 is equal to the total length of the plurality of first protruding portions 41. Accordingly, it is possible to decrease the eddy current loss in the plurality of first protruding portions 41 in comparison with a case in which one first protruding portion 41 extends in the X direction. As a result, it is possible to further decrease an influence of the eddy current loss on the EO response characteristics of the optical semiconductor device 1. Between the neighboring first protruding portions 41, the gradient angle γ of the top surface 5a of the resin body 5 is relatively decreased with respect to the gradient angle γ in a part in which a first protruding portion 41 (see FIG. 5A) is located therebetween since no first protruding portion 41 is located. When the distance L2 is equal to or less than 20 μm, the relative decrease can be reduced and thus the part V1 of the top surface 5a of the resin body 5 can be more reliably tilted.

In the optical semiconductor device 1, the widths of the first wirings 61 and 71 in the Y direction may be increased to adjust characteristic impedance of the differential transmission line including the first signal line 6 and the second signal line 7. In this case, when the first wiring 61 expands thermally or contracts thermally due to a change in temperature, the stress in the Y direction in the protective film 9 increases, and thus the stress between the first portion 91 and the second portion 92 may increase. Even in this case, since the angle α formed by the first portion 91 and the second portion 92 in the optical semiconductor device 1 is an acute angle, it is possible to decrease an influence of the stress between the first portion 91 and the second portion 92. Accordingly, with the optical semiconductor device 1, it is possible to decrease the stress between the first portion 91 and the second portion 92 and to adjust the characteristic impedance of the differential transmission line.

In the optical semiconductor device 1, the first wiring 61 is separated from the plurality of first protruding portions 41 when seen in the Z direction. Accordingly, since the distance between the first wiring 61 and the plurality of first protruding portions 41 in the Y direction is increased, it is possible to further decrease the eddy current loss in the plurality of first protruding portions 41. As a result, it is possible to further decrease an influence of the eddy current loss on the EO response characteristics of the optical semiconductor device 1.

In the optical semiconductor device 1, the distance W2 between the plurality of first protruding portions 41 and the first wiring 61 in the Y direction is, for example, equal to or less than 20 μm. When the distance W2 is equal to or less than 20 μm, the side surface 61b of the first wiring 61 is located in a more tilted part on the top surface 5a of the resin body 5. Accordingly, since the included angle β formed by the side surface 61b and the top surface 5a of the resin body 5 is less than 90°, the included angle α formed by the first portion 91 of the protective film 9 and the second portion 92 of the protective film 9 can be made to be less than 90°. As a result, with the optical semiconductor device 1, it is possible to further decrease the stress in the protective film 9 for protecting the resin body 5 and the first wiring 61. The distance W2 may be less than the width W1. For example, when the distance W2 increases over the width W1, the included angle ß and the included angle α become close to 90°.

In the optical semiconductor device 1, the resin body 5 includes benzocyclobutene (BCB). Since the resin body 5 has a thermosetting property, it is possible to easily form the resin body 5.

In the optical semiconductor device 1, the length L1 of each of the plurality of first protruding portions 41 in the X direction is, for example, equal to or greater than 5 μm and equal to or less than 30 μm. In the optical semiconductor device 1, the width W1 of each of the plurality of first protruding portions 41 in the Y direction is, for example, equal to or greater than 5 μm and equal to or less than 30 μm. When the length L1 is equal to or greater than 5 μm and the width W1 is equal to or greater than 5 μm, it is possible to easily provide the plurality of first protruding portions 41. When the length L1 is equal to or less than 30 μm and the width W1 is equal to or less than 30 μm, the area of each of the plurality of first protruding portions 41 in a plan view in the Z direction decreases and thus it is possible to further decrease the eddy current loss in the plurality of first protruding portions 41 when an electrical signal is transmitted in the first wiring 61. Accordingly, it is possible to further decrease an influence of the eddy current loss on the EO response characteristics of the optical semiconductor device 1.

In the optical semiconductor device 1, the length L1 of each of the plurality of first protruding portions 41 in the X direction is, for example, equal to or less than 10 μm. In the optical semiconductor device 1, the width W1 of each of the plurality of first protruding portions 41 in the Y direction is, for example, equal to or less than 10 μm. When the length L1 is equal to or less than 10 μm and the width W1 is equal to or less than 10 μm, the area of each of the plurality of first protruding portions 41 in a plan view in the Z direction is further decreased, and thus it is possible to considerably decrease the eddy current loss in the plurality of first protruding portions 41 when an electrical signal is transmitted by the first wiring 61. Accordingly, it is possible to considerably decrease an influence of the eddy current loss on the EO response characteristics of the optical semiconductor device 1.

MODIFICATIONS

Optical semiconductor devices 1A and 1B according to modifications of the embodiment will be described below with reference to FIGS. 6, 7, and 8. In description of the modifications, the same description as in the embodiment will be omitted, and differences from the embodiment will be described. That is, description of the embodiment can be appropriately used for the modifications unless it arises technical confliction.

First Modification

Figure 6:
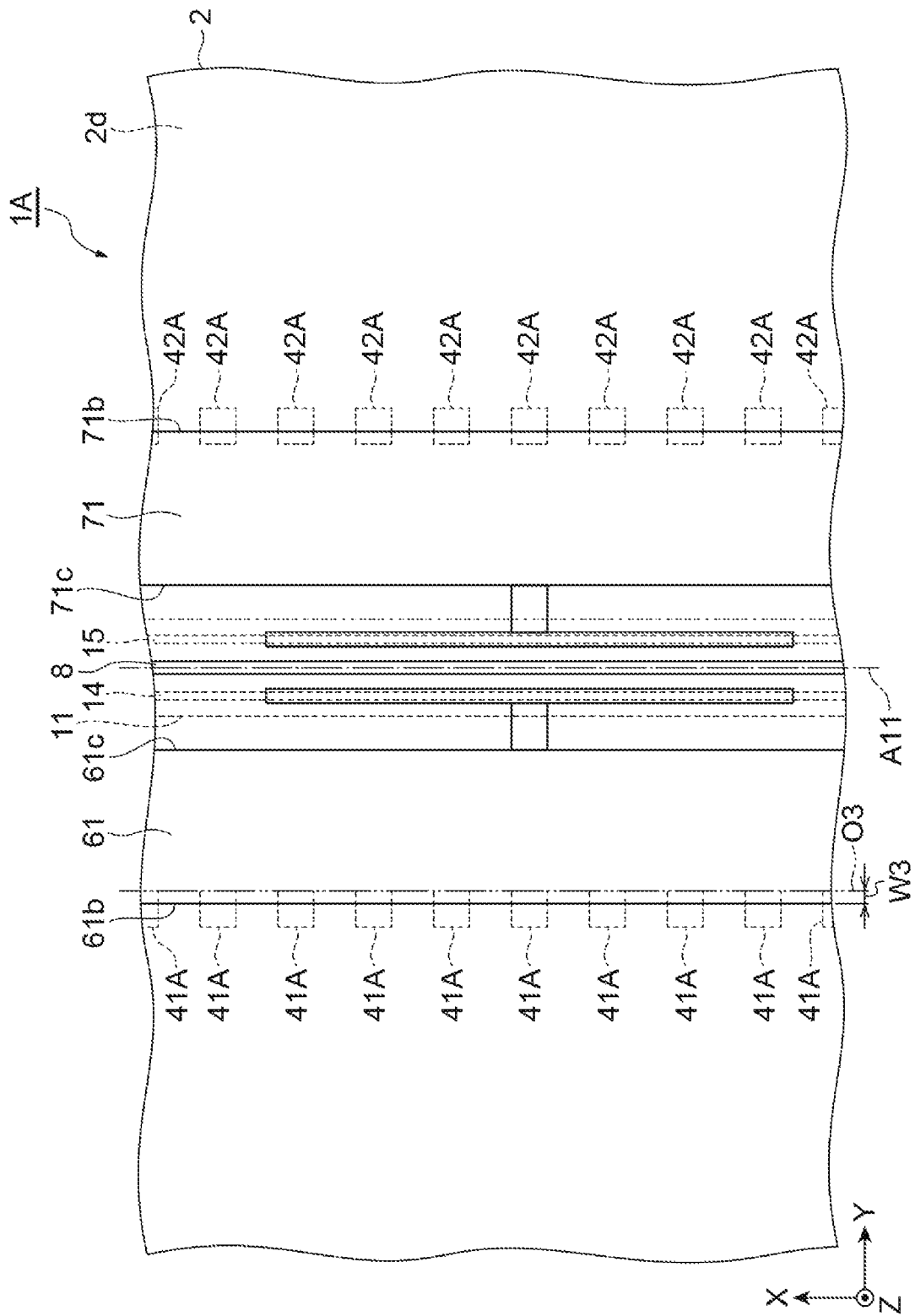
FIG. 6 is a partially enlarged plan view illustrating an optical semiconductor device according to a first modification.

FIG. 6 is a partially enlarged plan view illustrating an optical semiconductor device 1A according to a first modification. The optical semiconductor device 1A includes a plurality of first protruding portions 41A and a plurality of first protruding portions 42A. In the optical semiconductor device 1A, the positions of the plurality of first protruding portions 41A and 42A are different from the positions of the plurality of first protruding portions 41 and 42 of the optical semiconductor device 1 in a plan view in the Z direction. On the other hand, the configurations of the plurality of first protruding portions 41A and 42A are the same as the configurations of the plurality of first protruding portions 41 and 42.

When seen in the Z direction, a part of the first wiring 61 overlaps a part of each of the plurality of first protruding portions 41A. When a width of a part in which each of the plurality of first protruding portions 41A and the first wiring 61 overlap in the Y direction (a distance between a near end 03 of the first protruding portions 41A and the side surface 61b) is defined as W3, the width W3 is greater than 0 μm and is less than half the width W1 of each of the plurality of first protruding portions 41A in the Y direction.

When seen in the Z direction, a part of the first wiring 71 overlaps a part of each of the plurality of first protruding portions 42A. A range of a width of a part in which the plurality of first protruding portions 42A and the first wiring 71 overlap in the Y direction is the same as the range of the width W3.

With the aforementioned configuration of the optical semiconductor device 1A, it is possible to achieve the same advantages as in the embodiment. In the optical semiconductor device 1A, a part of the first wiring 61 overlaps a part of each of the plurality of first protruding portions 41A when seen in the Z direction. Accordingly, since the plurality of first protruding portions 41A can be disposed to be closer to the first wiring 61, it is possible to suppress an increase in the width of the optical semiconductor device 1A in the Y direction. Since the part of the first wiring 61 overlaps the part of each of the plurality of first protruding portions 41A, the side surface 61b of the first wiring 61 is provided between the center of the plurality of first protruding portions 41A and the near end 03 in the Y direction. Accordingly, the first wiring 61 is provided in a more tilted part on the top surface 5a of the resin body 5. As a result, the height in the Y direction of the virtual plane K passing through the contact point R and parallel to the principal surface 2a is smaller than the height of the resin body 5 at the center in the Y direction of the first protruding portions 41A. Accordingly, the included angle α formed by the first portion 91 of the protective film 9 and the second portion 92 of the protective film 9 is less than 90°. With the optical semiconductor device 1A, it is possible to further decrease the stress generated between the first portion 91 and the second portion 92.

Second Modification

Figure 7:
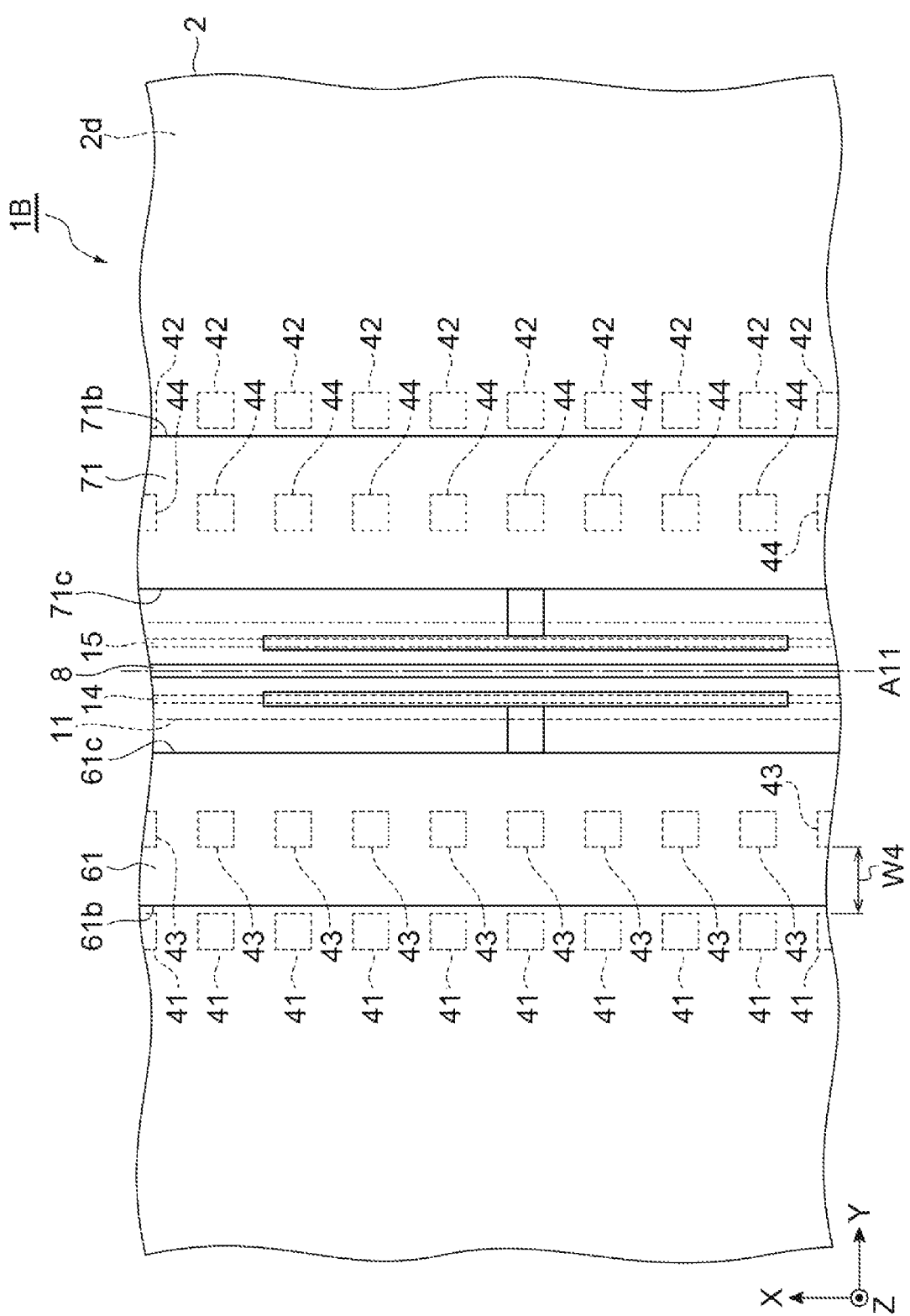
FIG. 7 is a partially enlarged plan view illustrating an optical semiconductor device according to a second modification.
Figure 8:
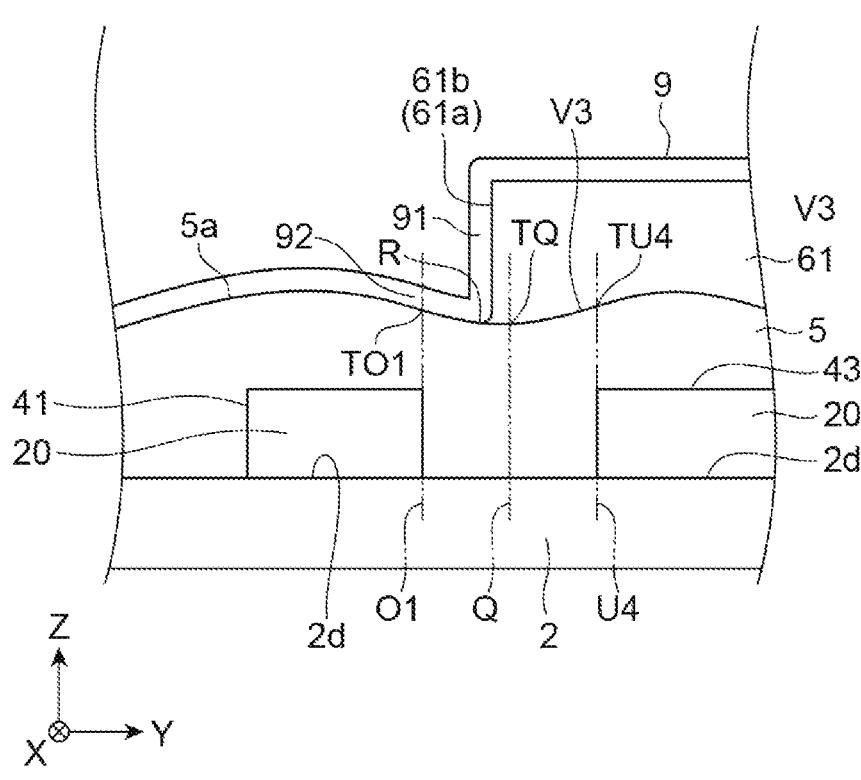
FIG. 8 is a sectional view schematically illustrating the optical semiconductor device according to the second modification.

FIG. 7 is a partially enlarged plan view illustrating an optical semiconductor device 1B according to a second modification. FIG. 8 is a sectional diagram schematically illustrating the optical semiconductor device 1B according to the second modification. The optical semiconductor device 1B has the same configuration as the optical semiconductor device 1 and further includes a plurality of second protruding portions 43 and a plurality of second protruding portions 44.

As illustrated in FIG. 7, the plurality of second protruding portions 43 are provided on the principal surface 2a and arranged in the X direction. When seen in the Z direction, the plurality of second protruding portions 43 are located inside of the first wiring 61. In other words, the plurality of second protruding portions 43 are located between the plurality of first protruding portions 41 and the first element portion 11.

Each of the plurality of second protruding portions 43 includes the first semiconductor layer 20 (see FIG. 3). For example, each of the plurality of second protruding portions 43 includes the first semiconductor layer 20 and a part of the substrate 2. Similarly to embedment of the plurality of first protruding portions 41 in the resin body 5 (see FIG. 3), the plurality of second protruding portions 43 are embedded in the resin body 5.

The plurality of second protruding portions 44 are provided on the principal surface 2a and arranged in the X direction. Each of the plurality of second protruding portions 44 may include the first semiconductor layer 20. For example, each of the plurality of second protruding portions 44 includes the first semiconductor layer 20 and a part of the substrate 2. When seen in the Z direction, the plurality of second protruding portions 44 are located inside of the first wiring 71. In other words, the plurality of second protruding portions 44 are located between the plurality of first protruding portions 42 and the first element portion 11. Similarly to embedment of the plurality of first protruding portions 41 in the resin body 5 (see FIG. 3), the plurality of second protruding portions 44 are embedded in the resin body 5.

Each of the plurality of second protruding portions 43 and each of the plurality of second protruding portions 44 have a rectangular shape when seen in the Z direction. The length range of each of the plurality of second protruding portions 43 and the length range of each of the plurality of second protruding portions 44 in the X direction are, for example, the same as the ranges of the length L1 (see FIG. 2) of each of the plurality of first protruding portions 41. The width range of each of the plurality of second protruding portions 43 and the width range of each of the plurality of second protruding portions 44 in the Y direction are, for example, the same as the range of the width W1 (see FIG. 2) of each of the plurality of first protruding portions 41. The plurality of second protruding portions 43 are separated from each other. The plurality of second protruding portions 44 are separated from each other. The distance range between the neighboring second protruding portions 43 and the distance range between the neighboring second protruding portions 44 are, for example, the same as the range of the distance L2 (see FIG. 2) between the neighboring first protruding portions 41.

The plurality of second protruding portions 43 are separated from the plurality of first protruding portions 41 in the Y direction. A distance W4 between the plurality of first protruding portions 41 and the plurality of second protruding portions 43 in the Y direction is, for example, equal to or greater than the distance W2 and equal to or less than double the width W1.

The plurality of second protruding portions 44 are separated from the plurality of first protruding portions 42 in the Y direction. A distance range between the plurality of first protruding portions 42 and the plurality of second protruding portions 44 in the Y direction is, for example, the same as the range of the distance W4 between the plurality of first protruding portions 41 and the plurality of second protruding portions 43 in the Y direction.

Undulations of the top surface 5a of the resin body 5 in the periphery of the first wiring 61 will be described below with reference to FIG. 8. Here, a far end of the plurality of second protruding portions 43 in the Y direction is defined as U4, and the center between the near end O1 and the far end U4 in the Y direction is defined as a center Q. Since the plurality of second protruding portions 43 are provided in the optical semiconductor device 1B, a part V3 of the top surface 5a of the resin body 5 is tilted such that the top end TU4 in the Z direction at the far end U4 of the resin body 5 is higher than the top end TQ in the Z direction at the center Q. That is, in the optical semiconductor device 1B, a recess to the bottom surface 2d in a part in which the side surface 61b of the first wiring 61 is provided on the top surface 5a of the resin body 5 is small. Accordingly, the periphery of the part in which the side surface 61b of the first wiring 61 is provided on the top surface 5a of the resin body 5 becomes flat. Undulations of the top surface 5a of the resin body 5 in the periphery of the first wiring 71 are the same as the undulations of the top surface 5a of the resin body 5 in the periphery of the first wiring 61.

In the optical semiconductor device 1B, the first wiring 61 is provided on the top surface 5a of the resin body 5 such that the side surface 61b is located between the near end O1 and the center Q in the Y direction. Accordingly, the included angle formed by the first portion 91 of the protective film 9 and the second portion 92 of the protective film 9 is an acute angle. The first wiring 71 is provided on the top surface 5a of the resin body 5 similarly to the mode in which the first wiring 61 is provided on the top surface 5a of the resin body 5.

With the aforementioned configuration of the optical semiconductor device 1B, it is possible to achieve the same advantages as in the embodiment. In addition, the optical semiconductor device 1B includes the plurality of second protruding portions 43 provided on the principal surface 2a and arranged in the X direction. The plurality of second protruding portions 43 are embedded in the resin body 5. The plurality of second protruding portions 43 are separated from each other and include the first semiconductor layer 20. When seen in the Z direction, the plurality of second protruding portions 43 are located inside of the first wiring 61. Since the plurality of second protruding portions 43 are located inside of the first wiring 61, the part in which the side surface 61b of the first wiring 61 is provided on the top surface 5a of the resin body 5 becomes flat. Accordingly, it is possible to decrease the stress in the side surface 61b of the first wiring 61.

In the optical semiconductor device 1B, the distance W4 between the plurality of first protruding portions 41 and the plurality of second protruding portions 43 in the Y direction is, for example, equal to or greater than the distance W2 and equal to or less than double the width W1. When the distance W4 is equal to or greater than the distance W2, it is possible to flatten the periphery of the side surface 61b of the first wiring 61. When the distance W4 is equal to or less than double the width W1, the center Q in the Y direction can be set to be close to the side surface 61b. Accordingly, it is possible to reliably flatten the periphery of the side surface 61b of the first wiring 61.

While an embodiment of the present disclosure has been described above in detail, the present disclosure is not limited to the embodiment and can be modified in various embodiments. For example, in the first element portion, the second element portion, and the third element portion, the first semiconductor layer may include group III-V compound semiconductor such as n-type InP, the core layer may include AlGaInAs-based group III-V compound semiconductor, and the second semiconductor layer 22 may include group III-V compound semiconductor such as p-type InP. The first element portion, the second element portion, and the third element portion may further include a diffusion preventing layer for preventing diffusion of dopants in the first semiconductor layer into the substrate. The first element portion, the second element portion, and the third element portion may further include a diffusion preventing layer for preventing diffusion of dopants in the substrate into the first semiconductor layer. For example, when such a diffusion preventing layer is provided, the height T2 of the mesa protruding portion 11a increases accordingly and the film thickness T1 of the resin body 5 also increases. When the film thickness T1 of the resin body 5 increases, the flatness of the top surface 5a decreases, but it is possible to decrease the stress generated on the side surface of the wiring by providing the protruding portions 4 as described above.

When a signal speed in the first signal line and the second signal line is low, the effect of the eddy current loss on the EO response characteristics of the optical semiconductor device may be acceptable. In this case, the length of the plurality of first protruding portion in the X direction may be set to be greater than 30 μm, and the width of the plurality of first protruding portions in the Y direction may be set to be greater than 30 μm. The distance between the neighboring first protruding portions may be set to be as small as possible unless the neighboring first protruding portions 41 come into contact.

A plurality of columns in which a plurality of second protruding portions are arranged in the X direction may be arranged in the Y direction. In this case, a part on the surface of the resin body on which the first wiring is provided becomes flatter. Accordingly, it is possible to further decrease the stress on the side surface of the first wiring.

Examples

Simulation results of EO response characteristics of the optical semiconductor device according to the embodiment will be described below. However, the present disclosure is not limited to the following examples.

In an optical semiconductor device 1 according to a first example, the length L1 in the X direction of each of the plurality of first protruding portions 41 was set to 10 μm, the width W1 in the Y direction of the plurality of first protruding portions 41 was set to 10 μm, the distance L2 between the neighboring first protruding portions 41 was set to 10 μm, and the distance W2 between the plurality of first protruding portions 41 and the first wiring 61 in the Y direction was set to 12.5 μm. In the optical semiconductor device 1 according to the first example, the length in the X direction of each of the plurality of first protruding portions 42 was set to 10 μm, the width in the Y direction of the plurality of first protruding portions 42 was set to 10 μm, the distance between the neighboring first protruding portions 42 was set to 10 μm, and the distance between the plurality of first protruding portions 42 and the first wiring 71 in the Y direction was set to 12.5 μm. The plurality of first protruding portions 41 and the plurality of first protruding portions 42 were disposed to be symmetric with respect to the center line A11 extending in the X direction of the first element portion 11.

In an optical semiconductor device 1 according to a second example, the length L1 in the X direction of each of the plurality of first protruding portions 41 was set to 40 μm, the width W1 in the Y direction of the plurality of first protruding portions 41 was set to 40 μm, the distance L2 between the neighboring first protruding portions 41 was set to 10 μm, and the distance W2 between the plurality of first protruding portions 41 and the first wiring 61 in the Y direction was set to 12.5 μm. In the optical semiconductor device 1 according to the second example, the length in the X direction of each of the plurality of first protruding portions 42 was set to 40 μm, the width in the Y direction of the plurality of first protruding portions 42 was set to 40 μm, the distance between the neighboring first protruding portions 42 was set to 10 μm, and the distance between the plurality of first protruding portions 42 and the first wiring 71 in the Y direction was set to 12.5 μm. The plurality of first protruding portions 41 and the plurality of first protruding portions 42 were not provided in an optical semiconductor device according to a comparative example.

Figure 9A:
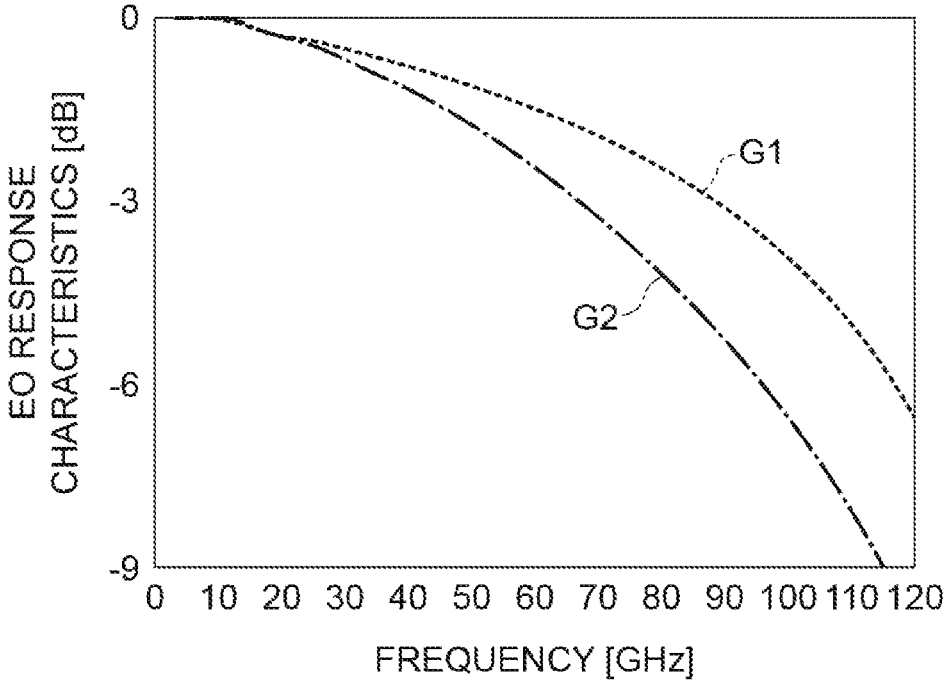
FIG. 9A is a graph illustrating EO response characteristics of optical semiconductor devices according to a first example and a second example.
Figure 9B:
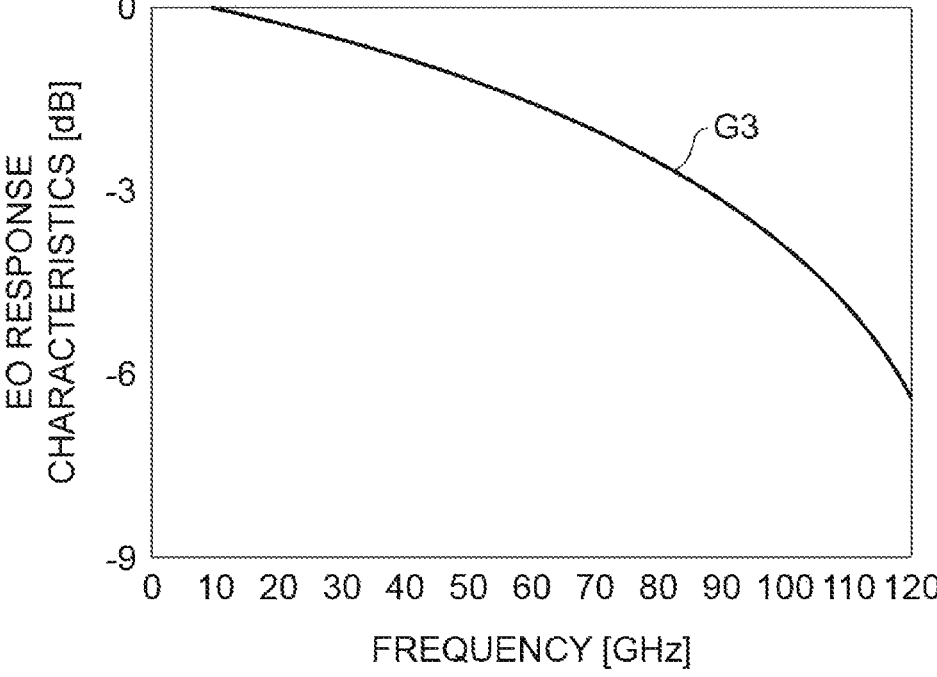
FIG. 9B is a graph illustrating EO response characteristics of an optical semiconductor device according to a comparative example.

Simulation results of the EO response characteristics in the examples and the comparative example are illustrated in FIGS. 9A and 9B. FIG. 9A is a diagram illustrating a graph G1 indicating the EO response characteristics of the optical semiconductor device 1 according to the first example and a graph G2 indicating the EO response characteristics of the optical semiconductor device 1 according to the second example, and FIG. 9B is a diagram illustrating a graph G3 indicating the EO response characteristics of the optical semiconductor device according to the comparative example. In the graphs in FIGS. 9A and 9B, the horizontal axis represents a frequency [GHz] and the vertical axis represents the EO response characteristics [dB]. The vertical axis uses an optical output power at 10 GHz as a reference, and the optical output power in any graph is 0 dB at 10 GHz. It is preferable that the EO response characteristics have a large value at a high frequency. The EO response characteristics of the optical semiconductor device 1 according to the first example are more excellent than the EO response characteristics of the optical semiconductor device 1 according to the second example. In the optical semiconductor device 1 according to the first example, the size of the plurality of first protruding portions 41 and 42 is smaller than the size of the plurality of first protruding portions 41 and 42 of the optical semiconductor device 1 according to the second example. Accordingly, the influence of the eddy current loss on the EO response characteristics of the optical semiconductor device 1 according to the first example is smaller than the influence of the eddy current loss on the EO response characteristics of the optical semiconductor device 1 according to the second example. The EO response characteristics of the optical semiconductor device 1 according to the first example are almost the same as the EO response characteristics of the optical semiconductor device according to the comparative example. A 3 dB band of the optical semiconductor device 1 according to the first example is wider than the 3 dB band of the optical semiconductor device 1 according to the second example and is almost the same as the 3 dB band of the optical semiconductor device according to the comparative example. These results represent that the size of the plurality of first protruding portions 41 and 42 in the optical semiconductor device 1 according to the first example are smaller, and thus the EO response characteristics are not deteriorated by the eddy current loss even when the plurality of first protruding portions 41 and 42 are provided. Accordingly, according to the examples, it is possible to decrease the stress in the protective film for protecting the resin body and the wiring while decreasing the influence on the EO response characteristics. In the optical semiconductor device 1 according to the second example, deterioration of the EO response characteristics is curbed to an allowable level. Through comparison between the first example and the second example, it can be understood that it is preferable to decrease the length L1 in the X direction and the width W1 in the Y direction of each of the plurality of first protruding portions 41 in order to widen the EO response characteristics to a higher frequency and to decrease the eddy current loss in an electrical signal transmitted by the first wiring 61 due to the first protruding portions 41. In this case, the distance W2 between the plurality of first protruding portions 41 and the first wiring 61 may be set according to the width W1 in the Y direction thereof.

What is claimed is:

1. An optical semiconductor device comprising:

a substrate including a principal surface;

an element portion provided on the principal surface and extending in a first direction;

a plurality of first protruding portions provided on the principal surface and arranged in the first direction;

a resin body including a top surface and embedding the element portion and the plurality of first protruding portions between the top surface and the principal surface;

a wiring provided on the top surface and extending in the first direction; and a protective film covering the top surface and the wiring, wherein the element portion includes a mesa protruding portion provided on the principal surface and including a first semiconductor layer, and a mesa waveguide provided on the mesa protruding portion, wherein the plurality of first protruding portions are separated from each other and each includes the first semiconductor layer, wherein the wiring is provided between the plurality of first protruding portions and the element portion in a second direction crossing the first direction, wherein the wiring includes a side surface extending in a third direction crossing the first direction and the second direction and in the first direction and adjacent to the plurality of first protruding portions, wherein the protective film includes a first portion covering the side surface and a second portion covering the top surface and connected to the first portion, and wherein an angle formed by the first portion and the second portion is acute.

2. The optical semiconductor device according to claim 1, wherein the wiring is separated from the plurality of first protruding portions in a plan view of the principal surface.

3. The optical semiconductor device according to claim 1, wherein the side surface overlaps the plurality of first protruding portions in a plan view of the principal surface.

4. The optical semiconductor device according to claim 1, wherein the resin body includes benzocyclobutene.

5. The optical semiconductor device according to claim 1, wherein each of the plurality of first protruding portions has a length in the first direction equal to or less than 10 μm and a width in the second direction equal to or less than 10 μm.

6. The optical semiconductor device according to claim 1, further comprising a plurality of second protruding portions provided on the principal surface and arranged in the first direction, wherein the plurality of second protruding portions are embedded in the resin body between the principal surface and the top surface, wherein the plurality of second protruding portions are separated from each other and each includes the first semiconductor layer, and wherein the plurality of second protruding portions are located inside of the wiring in a plan view of the principal surface.

* * * * *